United States Patent [19]

Litz et al.

[11] Patent Number: 4,900,480
[45] Date of Patent: Feb. 13, 1990

[54] GAS-LIQUID MIXING

[75] Inventors: Lawrence M. Litz, Pleasantville, N.Y.; Mark K. Weise, North Haledon, N.J.; Mitchell Adis, North White Plains, N.Y.

[73] Assignee: Union Carbide Corporation, Danbury, Conn.

[21] Appl. No.: 358,084

[22] Filed: May 30, 1989

Related U.S. Application Data

[63] Continuation of Ser. No. 921,198, Oct. 21, 1986.

[51] Int. Cl.[4] .............................................. B01F 3/04
[52] U.S. Cl. ................................ 261/36.1; 261/93; 261/123
[58] Field of Search ...................... 261/93, 36.1, 123

[56] References Cited

U.S. PATENT DOCUMENTS

| | | | |
|---|---|---|---|
| 697,069 | 4/1902 | Brushaber | 261/93 |
| 1,471,332 | 10/1923 | Greenawalt | 261/93 |
| 2,130,402 | 9/1938 | Textor | 261/93 |
| 2,615,698 | 10/1952 | Valentine | 261/93 |
| 2,881,057 | 4/1959 | Cole | 422/117 |
| 3,681,200 | 8/1972 | Ridgway | 195/142 |
| 3,806,452 | 4/1974 | Walker | 210/59 |
| 3,814,396 | 6/1974 | DiGregorio et al. | 261/93 |
| 4,017,565 | 4/1977 | Muller | 261/36 |
| 4,066,722 | 1/1978 | Pietruszewski et al. | 261/87 |
| 4,094,783 | 6/1978 | Jackson | 210/63 |
| 4,192,740 | 3/1980 | Savard et al. | 210/3 |
| 4,328,175 | 5/1982 | Roeckel et al. | 261/91 |
| 4,454,077 | 6/1984 | Litz | 261/91 |

FOREIGN PATENT DOCUMENTS

| | | | |
|---|---|---|---|
| 243984 | 2/1912 | Fed. Rep. of Germany | 261/93 |
| 941828 | 8/1948 | France | 261/93 |
| 1135095 | 4/1957 | France | 261/93 |
| 1163653 | 9/1969 | United Kingdom | 261/93 |

OTHER PUBLICATIONS

"A Novel Gas-Liquid Stirred Tank Reactor", CEP, Nov. 1985, L. M. Litz, pp. 36–39.

Primary Examiner—Tim Miles
Attorney, Agent, or Firm—Alvin H. Fritschler

[57] ABSTRACT

A feed gas stream is introduced directly into a recirculating liquid stream so as to facilitate formation and maintenance of gas bubbles in a dispersed form in a recirculating gas bubble-liquid mixture. By the maintaining of a gas-liquid interface and overhead gas phase in conjunction with a quiescent zone of liquid apart from the portion of liquid in which said mixture is maintained in a recirculating flow condition, the loss of appreciable amounts of gas to the overhead gas phase is avoided.

41 Claims, 3 Drawing Sheets

GAS-LIQUID MIXING

This is a continuation of application Ser. No. 06/921,198, filed Oct. 21, 1986.

BACKGROUND OF THE INVENTION

1. Field of the Invention

The invention relates to the mixing of gases and liquids. More particularly, it relates to the formation and recirculation of gas bubble-liquid mixtures.

2. Description of the Prior Art

A wide variety of techniques and systems are known in the art for achieving the mixing and/or reacting of gases. Thus, surface aerators, jets and impellers within stirred tanks have been employed for such mixing. When the residence time required for a desired mixing or reaction operation is longer than a few minutes, either on a batch or continuous basis, stirred tank reactors (STR) are commonly employed. As disclosed in "A Mixed Gas-Liquid Stirred Tank Reactor," L. M. Litz, CEP, November, 1985, pp. 36-39, gas is normally fed to a sparger at the bottom of a conventional STR, and a flat-bladed Rushton turbine or other such mixer system is used to shear the gas into small bubbles for dispersion in the liquid phase. Axial flow impellers are commonly employed to facilitate gas dissolution. Further dissolution is said to occur as the gas bubbles rise up through the liquid, but undissolved gas that reaches the gas-liquid interface in the upper part of the STR is normally lost.

The Litz publication refers to a new design STR, called an Advanced Gas Reactor (AGR), that enables gas dissolution and chemical reaction rates to be increased, while gas and power consumption is being reduced. In this AGR system, a down-pumping impeller is employed within a draft tube, with a baffle arrangement at the inlet thereof causing the liquid flowing into the top of the draft tube to form vortices. These vortices cause feed gas from the gas phase above the liquid to pass down through the draft tube. Additional information pertaining to the AGR system is contained in the publication, and in the Litz patent, U.S. Pat. No. 4,454,077, dated June 12, 1984.

It is well known to use such mixing systems for the reaction of oxygen containing gases, such as air, with organic liquids to form various oxygenated products. Typical of such processes are the oxidation of cumene to form cumene hydroperoxide useful as an intermediate in the production of phenol, the oxidation of propionaldehyde to propionic acid, the oxidation of cyclohexane to adipic acid, and the like. Similarly, such mixing systems can be used for the reaction of hydrogen with various organic chemicals or other materials, as in the hydrogenation of edible and non edible fats and oils, or of antioxidants, medicinals, aluminum alkyls, and the like.

When such gas-liquid mixing operations are carried out in relatively simple tanks or towers, the feed gas is typically bubbled in near the bottom of the tank. Mechanical agitation means may be employed to improve gas-liquid mass transfer, to improve heat exchange, or to maintain solid catalysts in suspension in the gas liquid reaction mixture. In some cases, a simple bubble column is employed, with the injected gas rising up through the body of liquid in the tank. In any event, the oxygen, hydrogen, chlorine or other reactive gas reacts directly when in bubble form, or dissolves in the liquid and then reacts, or experiences both forms of activity. Unreacted gas may be recirculated within the liquid phase, to some extent, by the flow of the liquid as influenced by impellers, as in a conventional STR configuration, or additionally by the liquid downflow in the AGR system in which a draft tube is employed.

Gas-liquid mixing operations must include provisions for changes in the volume of liquid resulting from the dispersion of gases therein. Accordingly, a free liquid surface with an overhead gas phase is typically provided for in mixing operations of the type described herein.

A serious limitation as to the amount of oxygen that may be fed into any of the reactor systems described above resides in the fact that many organic compounds can burn, or even explode, when their vapor is admixed with an oxygen-rich gas. It should be noted that little, if any, such safety problem exists when small gas bubbles of high oxygen content are dispersed within the liquid phase of such a flammable material. This is because the liquid phase provides a large heat sink capable of absorbing any rapid energy release that would occur if the gas bubbles were to ignite in the liquid at typical gas bubble concentrations of 5-20 volume %. There is, in addition, a concentration of oxygen in the vapor-gas phase below which combustion will not be sustained, i.e. a lower flammability limit. With respect to many organic materials, this lower flammability limit is in the range of about 8 to 12 volume percent. For safety reasons, reactors typically are fed only as much oxygen as will assure that the unreacted gas does not cause the oxygen in the gas phase to exceed the oxygen concentration of said lower flammability limit. A negative consequence of this limitation is that the oxygen content of the gas bubbles typically falls off considerably from a point of injection of the gas near the bottom of the reactor and the discharge of bubbles at the gas liquid interface near the top of the tank. As a result, the reaction rate and the gas dissolution rate, which typically are dependent upon the oxygen concentration in the gas bubbles, can decline substantially from the bottom to the top of a conventional reactor. It is well known, however, that, in some cases, it would be desirable to carry out a reaction at fairly high gas bubble oxygen concentrations, even up to pure oxygen feed gas, so as to increase the reaction rate or to improve reaction selectivity to the desired reaction rather than to undesired side reactions.

In the AGR system, as pointed out in the Litz publication, the gas that escapes into the gas phase is recirculated back into the liquid via the vortex ingestion path. While the AGR system can thus be employed to overcome the problems associated with loss of gas e.g. oxygen, into the vapor-gas phase, those skilled in the art will appreciate that the gas introduction rate of the AGR system is a function of the vortex characteristics of the system. While the AGR system provides highly desirable process and apparatus for mixing a gas and a liquid, it will thus be seen to require particular design expertise, especially with respect to the application thereof to operations in which a potentially explosive gas mixture could be created in the vapor-gas phase upon the carrying out of particular gas-liquid reactions at desirably high reaction rates. This is particularly so in light of the sensitivity of the AGR system to liquid level changes and of the fact that the vapor phase concentration of oxygen is in equilibrium with the concentration thereof in the liquid phase.

For the reasons above, there is a desire in the art for further gas liquid mixing development, particularly with respect to reactions subject to the potential of gas phase burning or explosions at desirable reaction rates using the reactor systems and techniques known in the art. Such further development would not replace the AGR approach, but would provide an alternative thereto, one not dependent upon the vortex characteristics, liquid level sensitivities and other pertinent factors relating to the AGR approach. While the concerns with respect to potentially explosive vapor-gas phase mixtures in oxygen applications do not generally pertain in hydrogen, chlorine and other gas applications, it is nevertheless desirable in the art to have an alternative approach available also for use in particular non-oxygen gas-liquid applications. Thus, in some instances, it may be desirable to carry out particular reactions in a manner not sensitive to variations in the liquid level existing within the reactor tank. It is also desirable in some instances to assure retention of the feed gas within the reactor volume by virtue of the system design, apart from the characteristics of a vortex as in AGR processing.

It is an object of the invention, therefore, to provide a process and apparatus for the mixing of a gas and liquid without appreciable loss of gas into the overhead gas phase.

It is another object of the invention to provide a process and apparatus for the enhanced mixing of gas and liquid by the use of a draft tube configuration without undue sensitivity to changes in the level of liquid during the processing operation.

It is a further object of the invention to provide a process and apparatus for the reaction of oxygen with organic liquids in which the concentration of oxygen in the vapor-gas phase is maintained below the lower flammability limit pertaining to said organic liquids.

With these and other objects in mind, the invention is hereinafter described in detail, the novel features thereof being particularly pointed out in the appended claims.

SUMMARY OF THE INVENTION

A major portion of a body of liquid, maintained in a recirculating flow condition, is separated from a relatively quiescent portion of said liquid by mechanical means, but with fluid communication therebetween. The quiescent portion of liquid has a gas-liquid interface with an overhead gas phase. A feed gas stream is introduced directly into the major portion of liquid. The bubbles of gas formed in the liquid are maintained essentially in dispersed form in the recirculating liquid in the major portion of said body of liquid. No appreciable loss of gas to the overhead gas phase occurs. In particular embodiments, various means can be employed to enhance the recirculating flow of liquid in said major portion of liquid, including the use of a hollow draft chamber, the retention of said quiescent portion of liquid in a separate surge vessel, and the use of a tube and shell reactor with an externally pumped recirculation stream maintaining the fluid communication with the quiescent portion of liquid in the surge vessel.

BRIEF DESCRIPTION OF THE DRAWINGS

The invention is further described herein with reference to the accompanying drawings in which.

DETAILED DESCRIPTION OF THE INVENTION

The objects of the invention are accomplished by introducing a feed gas directly into a recirculating portion of a body of liquid separated mechanically from, but in fluid communication with, the remaining portion of said liquid maintained in a separate, relatively quiescent state. The quiescent portion of liquid has a gas liquid interface, with an overhead gas phase. As will be appreciated from the description herein, the major portion of liquid has no such gas-liquid interface and overhead gas phase apart from that provided by said quiescent body of liquid. The major portion of liquid is maintained in a recirculating flow condition, facilitating the formation of gas bubbles upon said direct introduction of feed gas to said liquid. By various means, such gas bubbles are maintained essentially in dispersed form for gas dissolution in, and reaction with, the recirculating liquid in the container vessel. In the practice of the invention, the desired gas-liquid mixing operation is accomplished without appreciable loss of gas to the overhead gas phase.

As will be appreciated from the background discussion above, the invention is particularly advantageous with respect to applications in which an oxygen-containing feed gas is to be fed to a reactor system containing an organic liquid capable of burning, or even exploding, upon admixture of its vapor with an oxygen rich gas. The invention enables the gas-liquid reaction to be carried out without the necessity for employing lower than the desired oxygen concentrations in order to prevent the oxygen in the gas phase from exceeding the lower flammability limit for the particular operation and system. It will be understood, however, that the invention can also be practiced advantageously with respect to hydrogen, chlorine and other gas-liquid reaction applications in which there is no such concern over the development of potentially explosive vapor-gas phase mixtures. As indicated above, there are instances in which it is desirable to carry out a particular reaction in a manner not sensitive to variations on the liquid level existing in the reactor vessel. For such applications, and in those in which it may otherwise be desirable to assure retention of the feed gas within the reactor vessel by virtue of the reactor design, apart from the maintenance of suitable vortex characteristics as in AGR processing, the subject invention provides a highly desirable process and system for carrying out desirable gas-liquid mixing operations.

Figure 1:
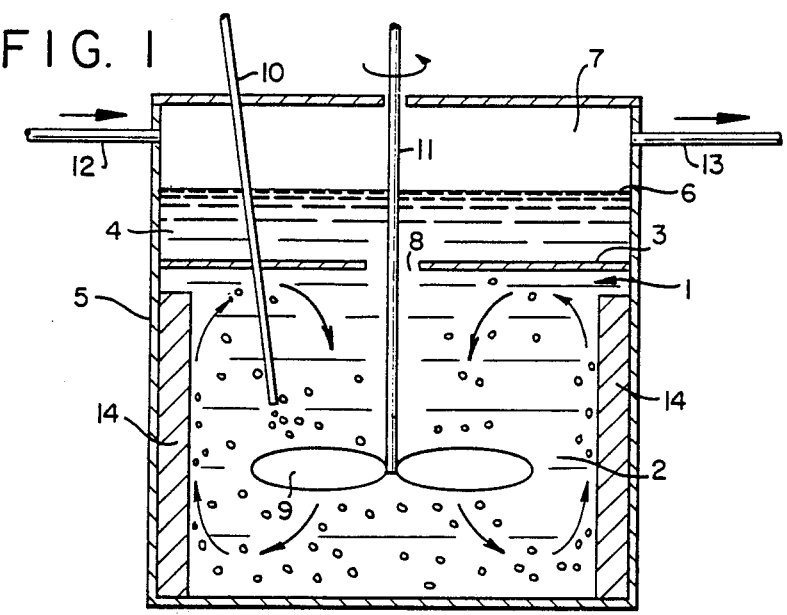
FIG. 1 is a schematic side elevational view of a container vessel representing an embodiment of the invention.

In one embodiment of the invention, as illustrated in FIG. 1, the major, portion of liquid is separated from said quiescent portion thereof by baffle means positioned within the body of reactive liquid. The body of liquid is represented in said Figure by the numeral 1 and has a major portion 2 separated by mechanical means, i.e. baffle means 3, but in fluid communication with a relatively quiescent portion 4 of said liquid in reactor vessel 5. Said quiescent portion 4 has a gas-liquid interface 6 with overhead gas phase 7. Baffle means 3 are illustrated for convenience as a substantially horizontal partition having opening 8 therein establishing said fluid communication between major portion 2 and quiescent portion 4 of liquid body 1. Said major portion 2 is maintained in a recirculating flow condition, in the illustrated embodiment, by down axial flow impeller 9 that produces the indicated vertical flow pattern. The feed gas stream is introduced through conduit means 10 directly into said major portion 2 of liquid such that the bubbles of gas formed in said liquid are maintained essentially in dispersed form in the recirculating liquid in said major portion of the body of liquid. It will be noted that, in the illustrated embodiment, drive shaft 11 of impeller means 9 extends upward through baffle opening 8 for connection with suitable driving means, not shown.

Baffle means 3 are desirably positioned, with respect to the recirculating stream of liquid and dispersed gas bubbles, so as to obviate the accumulation of individual gas bubbles under said baffle means 3 in excess of about 2 cm$^3$ in volume, preferably in excess of about 1 cm$^3$. By such means, essentially all of the injected gas and the liquid in major portion 2 of liquid body 1 is advantageously involved in the desired gas-liquid mixing and recirculation operation. Baffle means 14 are desirably employed essentially along the walls of vessel 5 and below partition 3 to inhibit the general rotary motion of the gas-liquid phase, to assist in the pumping action of impeller 9, and to avoid the development of a gas filled vortex above impeller 9 and below partition 3. In the practice of the invention, it is generally desirable to pass a small flow of inert gas through overhead gas phase 7 to purge feed gas, or any component thereof, from said overhead phase. For this purpose, inert gas introduction means 12 and inert gas withdrawal, or vent, means 13 are shown in the drawing. When the feed gas comprises an oxygen containing gas, it will be understood that such flow of inert gas is conveniently employed to purge the oxygen content of the overhead gas phase to assure that it remains below the flammability limit thereof.

It will be appreciated that various changes and modifications can be made in the illustrated embodiment of FIG. 1 without departing from the scope of the subject invention. Thus, an axial flow impeller designed to pump the liquid up the center of major portion 2 of liquid body 1, across baffle means 3 and down the region adjacent to the reactor vessel wall could also be conveniently employed. Depending on the reactor vessel size and diameter/height ratio, it may also be desirable to use more than one such axial flow impeller, or other suitable recirculation means, to produce the desired flow patterns and velocities for recirculation of gas bubbles within the reaction vessel. It may also be desirable, in some embodiments, to use a radial flow impeller to provide a region of high shear so as to reduce the size of the gas bubbles, thereby increasing the gas-liquid surface area. Another benefit of gas bubble size reduction, typically in the operating range of 0.1 to 10 mm, is that the recirculating liquid velocity required to carry the bubbles down into the liquid region below baffle means 3 can be desirably reduced. It will also be appreciated that said baffle means 3, illustrated for convenience as a horizontal partition, can be of any other suitable configuration, and the opening or openings therein to establish fluid communication between major portion 2 and quiescent portion 4 of the body of liquid can be varied depending on the overall process and system being employed so long as the desired separation is maintained between said portions of liquid, but with fluid communication therebetween. It will also be appreciated that the opening or openings in said baffle means of the illustrated embodiment can be varied depending upon the requirements of a given application, but will generally comprise a small portion of the cross-sectional area of reactor vessel 5 as compared with that in which the mechanical separation of liquid is maintained by baffle means 3. In this manner, the gas and liquid reactants can be mixed and recirculated without appreciable loss of gas to the overhead gas phase.

Figure 2:
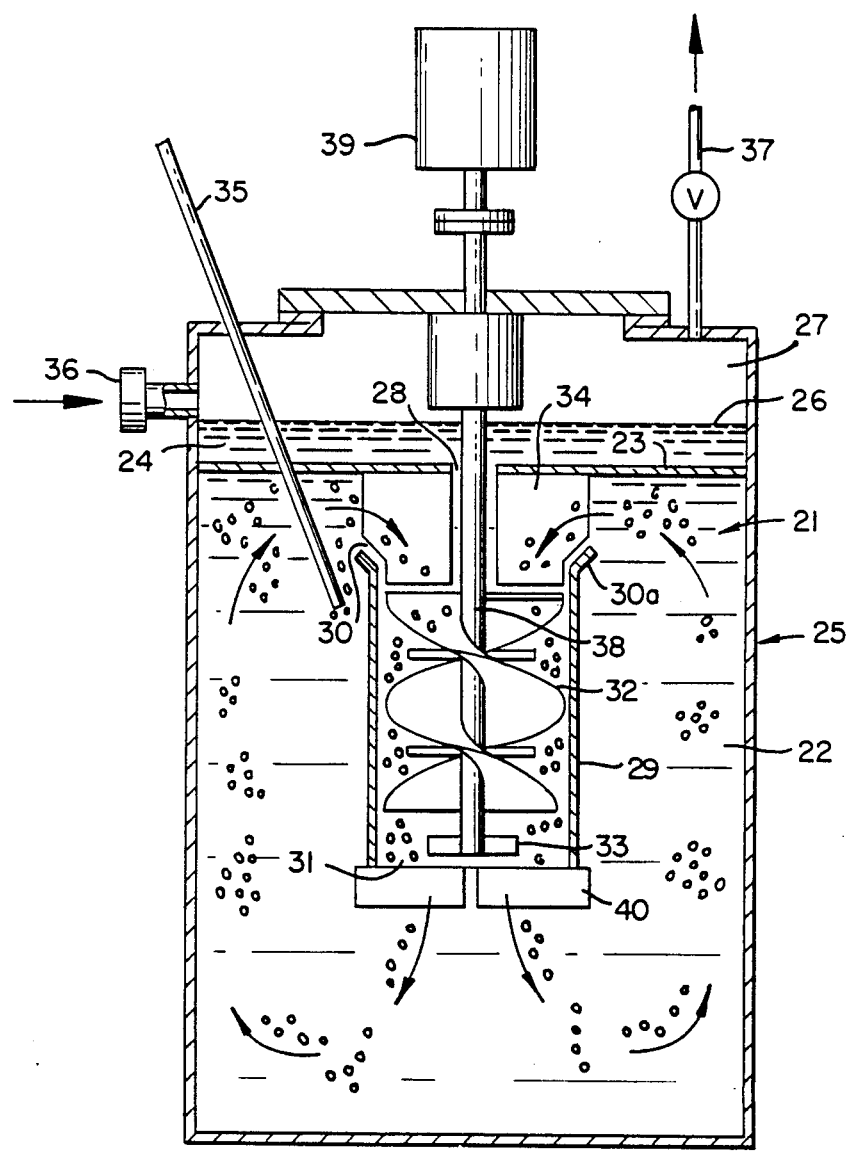
FIG. 2 is a schematic side elevational view of a different container vessel configuration representing another embodiment of the invention, wherein a hollow draft chamber is employed.

A desirable embodiment of the invention that facilitates the establishing of the desired recirculating flow condition in the major portion of the body of liquid is shown in FIG. 2 of the drawings. In this embodiment, the major portion 22 of liquid body 21 is again separated by baffle means 23 from quiescent portion of liquid 24 in reactor vessel 25. Said quiescent portion 24 has a gas-liquid interface 26 with overhead gas phase 27. Opening 28 in said baffle means 23 establish fluid communication between major portion 22 and quiescent portion 24 of said liquid body 21. Major portion 22 is maintained in recirculating flow condition by the essentially central positioning within reactor vessel 25 of a hollow draft chamber 29 such that the open ends thereof, i.e. ends 30 and 31 are at the top and bottom thereof, respectively, and impeller means 32 are positioned within said hollow draft chamber 29. Such impeller means 32 are typically helical impeller means adapted to facilitate the downward flow of the gas bubble-liquid mixture in the draft chamber and upward flow outside said chamber. Impeller means 32 may, if desired, include radial flow impeller means 33 and lower baffle means 40, similar to the guide baffle means referred to below, to reduce the size of the gas bubbles that are maintained in the indicated recirculating flow condition as the gas bubble-liquid mixture in major portion 22 of liquid body 21 is caused to pass downward through hollow draft chamber 29 and up the outer sides of hollow draft chamber 29. The flow of said gas bubble-liquid mixture into the top end 30 and out of the bottom end 31 of said hollow draft chamber 29 is desirably facilitated by the directing of said mixture to top inlet end 30 by guide baffle means 34 positioned at the upper portion of said major portion 22 of liquid body 21 below baffle means 23. As in the FIG. 1 embodiment, said baffle means 23 are desirably positioned so as to obviate the accumulation of individual gas bubbles thereunder in excess of about 2 cm$^3$ in volume.

The feed gas stream is injected directly into major portion 22 of liquid body 21 through conduit means 35 so that the bubbles of gas formed in the liquid are readily maintained essentially in dispersed form in the recirculating liquid in said major portion of the body of liquid. Gas inlet means 36 and outlet vent means 37 are provided to enable inert gas to be passed, if desired, through overhead gas phase 27 to assure that the concentration of oxygen or other inflammable gas is maintained below its flammability limit. Impeller means 32 include a suitable drive shaft 38 that extends upward through opening 28 in baffle means 23, as in the FIG. 1 embodiment, for connection with suitable driving means generally represented by the numeral 39. It, will be noted that hollow draft chamber 29, in particular applications, desirably includes a conically flared portion 30a at the upper end thereof, to further facilitate the flow of the gas bubble-liquid mixture into said draft chamber for downward passage therein.

Figure 3:
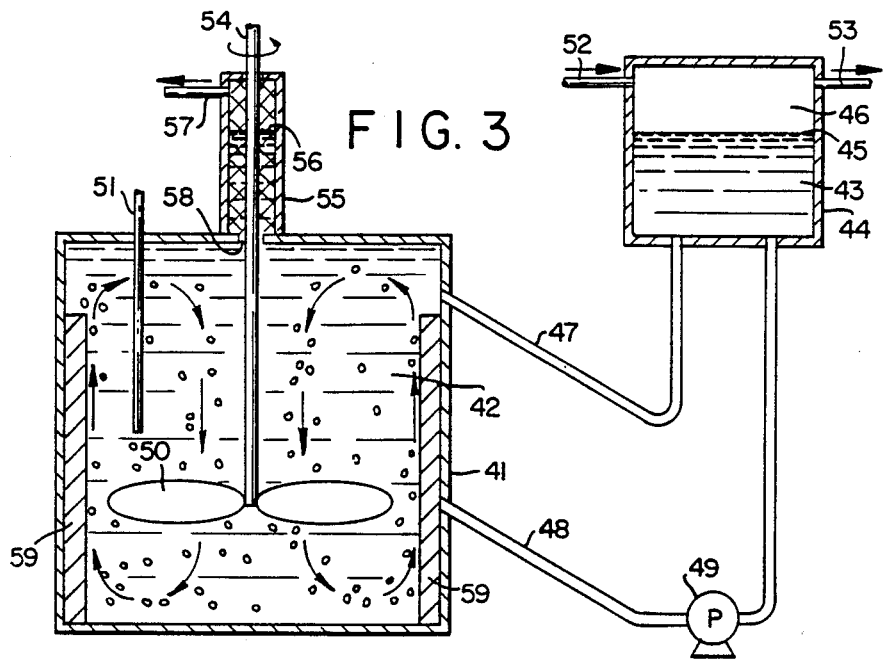
FIG. 3 is a schematic side elevational view of a container vessel-surge vessel configuration representing a further embodiment of the invention.

In the embodiment illustrated in FIG. 3, the major portion, of said body of liquid is separated from the quiescent portion thereof by the retention of the quiescent zone in a separate surge vessel fluidly connected to an essentially liquid filled container or reactor vessel. The surge vessel has therein the gas-liquid interface with an overhead gas phase as discussed above. The container vessel, represented in said FIG. 3 by the numeral 41, contains the major portion 42 of liquid that is in fluid communication with the quiescent portion 43 of liquid maintained in surge vessel 44. Gas-liquid interface 45 separates said quiescent portion of liquid from overhead gas phase 46 in said surge vessel 44. The fluid connection between the vessels includes conduit means 47 in which the flow of the liquid from container vessel 41 is, in preferred applications of the invention, initially in a generally downward direction to facilitate gas-liquid separation, return of gas to said container vessel 41, and then upward flow of essentially gas-free liquid into said surge vessel 44. To preferably pass the liquid from the recirculation circuit back into container vessel 41 without passage of gas back to surge vessel 44, the recirculation circuit includes return conduit means 48 that passes downward from said surge vessel 44 and then generally upward to said container vessel 41. By such a combination of preferred flow paths in the recirculation circuit, the passage of gas bubbles to the surge vessel is desirably minimized. The flow of said liquid in the recirculation circuit is desirably facilitated by recirculation pump means, as by pump means 49 shown positioned in return conduit means 48.

In container vessel 41, impeller means 50, e.g. axial flow impeller means, are used to provide the indicated vertical recirculating flow pattern. The feed gas stream is introduced through conduit means 51 directly into said major portion of liquid 42, as in the other illustrative embodiments referred to above, such that the bubbles of gas formed in the liquid are maintained essentially in dispersed form in the recirculating liquid. As in the FIG. 1 embodiment, baffle means 59 are desirably positioned at points essentially along the walls of container vessel 41 to inhibit any general rotary motion of the gas-liquid phase, to assist in the pumping action of impeller means 50, and to avoid the development of a gas filled vortex above impeller means 50 in said container vessel 41. Inlet means 52 and outlet means 53 can be provided, if desired, to enable purge gas to be passed through overhead gas phase 46 in surge vessel 44 to assure that the reactive gas content therein is maintained below its lower flammability limit.

Impeller means 50 include a drive shaft 54 for connection to suitable driving means, not shown. Drive shaft 54 will be seen to pass through the top of container vessel 41 and through a flame arrestor zone 55 positioned on the top of said container vessel 41. Said flame arrestor zone 55 is employed so as to have a free surface 56 of said body of liquid therein, with a suitable gas discharge conduit 57 above said surface. It will be understood that an annulus 58 will be positioned between the upwardly extending drive shaft 54 and the structure of container vessel 41. Any small amount of gas that escapes from said container vessel 41 through said annulus will, of necessity, pass through said flame arrestor zone 55 having said free surface of liquid and overhead gas therein. Gas escaping from container vessel 41 is conveniently released through discharge means 57 positioned above said free surface 56 of said flame arrestor. Suitable packing may also be employed in said zone. By such a flame arrestor means, the small amount of gas that escapes through the small annulus between the top of the container or reactor vessel and the impeller shaft is prevented from igniting in the proximity of the main body of the gas-liquid mixture that substantially fills said container vessel. Surge vessel 44 provides for the change in volume between the initial condition when no gas bubbles are in the container vessel and the condition that exists when the appropriate gas bubble concentration is developed for a desired reaction. The liquid level in surge vessel 44 can be used as a control on the addition of gas to the container vessel so as to maintain the desired concentration of gas bubbles in the liquid.

Those skilled in the art will appreciate that various changes and modifications can be made to this embodiment, as well as to other embodiments of the invention, without departing from the scope of the invention as recited in the appended claims. For example, if desired to circulate liquid from surge vessel 44 back to container vessel 41 so as to allow it to be oxidized or otherwise treated, pump means 49 can be used as indicated above. Alternatively, the conduit for fluid flow in said recirculation circuit can be made of sufficient, diameter and short length as to permit adequate transfer between said surge vessel and said container vessel by convection and diffusion.

Figure 4:
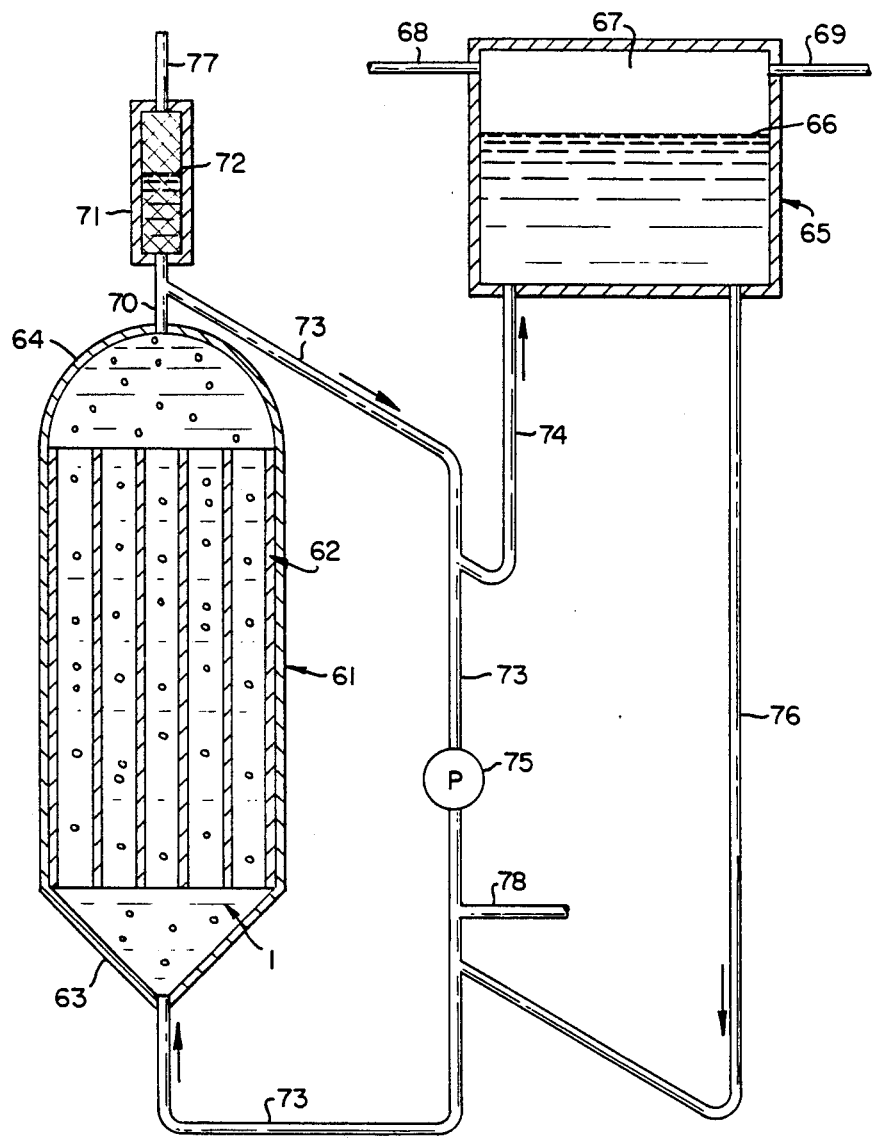
FIG. 4 is a schematic side elevational view of a variation of the configuration of FIG. 3, wherein a shell and tube type vessel is employed as said container vessel.

In still another embodiment of the invention illustrated in FIG. 4, the fluid circulation is implemented by means of an external pump instead of by impeller means positioned within the reactor, as in the previously illustrated systems. This embodiment is particularly suitable when a tube and shell reactor design is preferred for high heat-transfer requirements or when a catalyst to be utilized is conveniently packed into the tubes. The tube bundles 62 of tube and shell reactor 61 are adapted for the up-flow of the gas bubble-liquid mixture in the illustrated embodiment, but can be employed in either an up-flowing or down-flowing fashion. Feed mixture is passed to said tubes through lower plenum chamber 63, while upper plenum chamber 64 provides for the discharge of said mixture therefrom. The major portion of liquid in said reactor 61 is separated from the quiescent portion of liquid by the retention of said quiescent portion in separate surge vessel 65 in fluid communication with said reactor 61. Said surge vessel 65 has a gas-liquid interface 66 therein, with an overhead gas phase 67. The overhead gas phase can be purged to maintain the concentration of oxygen or other reactive gas below its lower flammability limit by the passage of a suitable inert gas to said overhead space through inlet conduit means 68, with discharge of gas therefrom through conduit means 69. Fluid communication of said surge vessel 65 with reactor 61 is maintained through fluid communication of said surge vessel 65 with the external recirculation circuit 73 of said tube and shell reactor 61. In a preferred embodiment as illustrated in FIG. 4, the gas-bubble-liquid mixture in said external recirculation circuit is caused to flow from reactor 61 through line 70 for initial fluid communication with overhead flame arrestor zone 71, which has a free surface of liquid 72 therein. Fluid communication between the recirculation circuit and said surge vessel 65 is maintained by separate conduit means 74 adapted for passing a portion of the liquid from recirculation circuit 73 to said surge vessel upstream of said recirculation pump 75. Similarly, conduit 76 is adapted to pass said liquid from said surge vessel to said recirculation circuit 73 downstream of said recirculation pump 75. The flow of said liquid from recirculation circuit 73 into conduit 74 communicating with surge vessel 65 is preferably in a generally downward direction, and the flow of said liquid back into said recirculation circuit from conduit 76 is in a generally upward direction, thereby minimizing the passage of gas bubbles to said surge vessel 65.

In the practice of the FIG. 4 embodiment, the use of flame arrestor zone 71, typically packed to provide flame arrestor characteristics, is a convenient gas vent feature adapted to safely discharge, oxygen-rich gas or other reactive gas through vent 77 when the circulation of the gas bubble-liquid mixture is interrupted. The oxygen-rich or other desired feed gas is introduced into the system at any convenient location, as through line 78 that is positioned so as to assure that the gas bubbles are well dispersed in the liquid in recirculation circuit 73 before the gas bubble-liquid mixture enters plenum chamber 63. In the practice of the invention in this embodiment, as in others, the gas-liquid recirculation system is desirably configured to prevent accumulation of any large gas bubbles, e.g. in excess of 15 mm in diameter, while maintaining an oxygen rich gas bubble concentration, for typical oxidation reaction applications, in the range of about 5 to 20 volume percent. If a down-flowing mode of application is utilized, the minimum flow velocity in said upper plenum chamber 64 and said lower plenum chamber 63, which then would feed and discharge tube bundle 62, has been found in general to be at least 0.3 m/s to insure that the gas bubbles are carried satisfactorily with the liquid into the tubes. It is also generally desirable that recirculation circuit 73 be sized so that the velocity therein is sufficiently high to keep the gas bubbles well dispersed. This desired velocity will vary depending on the physical properties of the fluid involved, but for water-oxygen mixtures, it should generally exceed about 3 m/s. Surge vessel 65 provides for volume expansion when the feed gas is passed into the recirculating liquid, and the volume of gas bubbles within the liquid may be conveniently controlled by observation of the liquid level 66 within said surge vessel 65.

It is generally desirable in applicable embodiments, as in those of FIGS. 1 and 2 of the drawings, to maintain the major -portion of the body of liquid in a recirculating flow condition such as to preclude the existence of any significant passive regions of said major portion of liquid in which essentially no gas bubbles are dispersed in said liquid. It should be noted, however, that the container vessel, may extend deeper than is shown in FIGS. 1 and 2, even though the lower regions in said vessel may contain passive liquid outside the recirculation flow condition created in the major portion of said body of liquid. Such embodiments are operable and are within the scope of the invention as herein disclosed and claimed, although not preferred because of the unused volume of liquid present in the container vessels thereof.

As an illustrative example of the benefits of the invention, 3 liters of 2-ethylhexaldehyde were placed in a 6" diameter reactor of the type shown in FIG. 2. The liquid level prior to the addition of oxygen to the system was about 2 cm above the horizontally positioned baffle means 23. Nitrogen was used as an inert gas to purge the reactor prior to the addition of said aldehyde. A slow nitrogen purge was maintained in overhead gas phase 27 to insure that the oxygen in said gas phase was maintained below 4% by volume. Provisions were made to feed oxygen gas as a stream of bubbles of less than about 6 mm into the liquid phase below said baffle means 23 and at a location where these bubbles would be carried with the recirculating liquid phase in a well dispersed form. A coil in the reactor heated the initial charge to the desired reaction temperature and maintained said temperature during the reaction period. When the liquid reached the desired temperature, the 3" diameter helical impeller was turned on at a rotational speed of 800 RPM, said speed being sufficient to insure that the liquid velocity down hollow draft chamber 29 was in excess of 0.3 mm/s. The pure oxygen feed gas initiated and controlled at a flow rate such that the level of the free liquid surface was maintained about 2 cm above the level existing prior to starting the oxygen flow. This level change corresponded to a change in the total volume below the horizontal baffle 23 of about ten volume percent due to the presence of the gas bubbles therein, said volume being a convenient and readily dispersed concentration of oxygen. As said oxygen was consumed, additional quantities thereof were introduced into the liquid phase in order to hold the liquid level at the desired point. By observing the quantity of oxygen consumed, the degree of reaction can be measured. From the known liquid properties of the mixture of starting materials and the liquid reaction products, changes in liquid volume can be accounted for, and, the control point can be adjusted accordingly. Samples of the liquid phase below the baffle were periodically withdrawn for chemical analysis.

As the reaction proceeded, the oxygen uptake rate fell off, and the rate of oxygen feed was accordingly reduced to maintain the liquid level. Therefore, the oxygen bubble concentration in the liquid phase was maintained essentially constant. The overhead gas phase was continuously monitored to insure that its oxygen concentration did not approach its lower flammability limit. A nitrogen purge rate of about 0.15 l/min was sufficient to assure that the oxygen content of the gas phase was maintained below about 2%. Thus, the practical feasibility of carrying out a typical oxidation process with pure oxygen, or with a high oxygen content gas, in the gas bubbles employed in a gas bubble-liquid mixture, while maintaining the overhead gas phase well below the lower flammability limit of oxygen and the subject organic vapor, was demonstrated in this representative example.

It will be appreciated from the above that the oxygen-containing gas used in particular gas-liquid applications of the invention can be of any suitable oxygen concentration, even up to essentially pure oxygen. Furthermore, such applications can be carried out, in the practice of the invention, under efficient gas bubble formation, dispersion, dissolution and reaction conditions without exceeding the lower flammability limits of the free gas volume above the liquid. The invention also provides, in oxygen applications not involving the potential presence of flammable mixtures in the gas phase and in valuable hydrogenation, chlorination and other practical gas-liquid operations, a highly desirable alternative to various stirred reactor operations and even to the more efficient gas liquid mixing of AGR systems that are more process variable dependent than are the process and system herein described and claimed. The invention thus represents a highly desirable and practical advance in the field of gas-liquid mixing and reaction.

We claim:

1. An improved process for the introduction of a gas into a body of liquid without appreciable loss of gas into an overhead gas phase comprising:

(a) maintaining a portion of said body of liquid in a recirculating flow condition within a container vessel, said recirculating portion of the body of liquid having no gas-liquid interface with an overhead gas phase, said recirculating portion of the body of liquid being separated by mechanical means, but in fluid communication with, a relatively quiescent portion of said body of liquid, said quiescent portion of the body of liquid having a gas-liquid interface with an overhead gas phase and being adapted to accommodate a change in liquid level in response to a change in the volume of said body of liquid between the condition in which no gas bubbles are in said body of liquid and the condition that exists when a desired gas bubble concentration is developed within said body of liquid; and (b) introducing a feed gas stream directly into the recirculating portion of said body of liquid and not into said quiescent portion thereof, the recirculation flow path and flow velocity of said recirculating portion of the body of liquid being such, relative to the fluid communication between said recirculating and quiescent portions of the body of liquid, that the bubbles of gas formed upon the introduction of feed gas into said recirculating portion of the body of liquid are maintained in dispersed form in the recirculating liquid, for gas dissolution in, or reaction with, said recirculating portion of the body of liquid, without any appreciable passage of said gas bubbles through the fluid communication between the recirculating portion of the body of liquid and the quiescent portion thereof and through the quiescent portion itself to the gas-liquid interface and thus without loss of gas to the overhead gas phase, whereby the gas and liquid are advantageously mixed and recirculated in said recirculation portion of the body of liquid without appreciable loss of gas to the overhead gas phase.

2. The process of claim 1 in which said recirculating portion of liquid is separated from said quiescent portion thereof by baffle means positioned within the body of liquid.

3. The process of claim 1 in which said recirculating portion of liquid is maintained in said recirculation flow condition such as to preclude the existence of any significant passive regions of said major portion of liquid in which there are essentially no gas bubbles dispersed in said liquid 4. The process of claim 1 in which said gas comprises an oxygen containing gas.

5. The process of claim 1 and including passing an inert gas through said overhead gas phase to purge said feed gas, or any component thereof, from said overhead gas phase.

6. The process of claim 1 in which said recirculating portion of liquid is maintained in a recirculating flow condition by an axial flow impeller positioned therein.

7. The process of claim 1 in which said recirculating portion of liquid is maintained in a recirculating flow condition by the essentially central positioning therein of a hollow draft chamber such that the open ends of said chamber are at the top and bottom thereof and impeller means positioned within said chamber is operated to cause the gas bubble-liquid mixture in said major portion of liquid to pass through said hollow draft chamber.

8. The process of claim 7 in which the flow of said gas bubble liquid mixture into the top end and out of the bottom end of said draft chamber is facilitated by the directing of said mixture to the upper inlet end of said draft chamber by guide baffle means positioned at the upper portion of said recirculating portion of liquid below said mechanical means.

9. The process of claim 7 in which said recirculating portion of the body of liquid is separated from said quiescent portion thereof by baffle means positioned within said body of liquid, said positioning being such as to obviate the accumulation of individual gas bubbles in excess of about 2 $cm^3$ thereunder.

10. The process of claim 7 in which said gas comprises an oxygen containing gas.

11. The process of claim 7 in which the flow of said gas bubble liquid mixture into the top end and out of the bottom end of said draft chamber is facilitated by the directing of said mixture to the upper inlet end of said draft chamber by guide baffle means positioned at the upper portion of said recirculating portion of liquid below said baffle means, the size of gas bubbles in said mixture being reduced by passing the recirculating gas bubble-liquid mixture through radial flow impeller means and baffle means positioned in the draft chamber below said axial impeller means.

12. The process of claim 1 in which a recirculating portion of said liquid is separated from the quiescent portion thereof by the retention of said quiescent zone in a separate surge vessel fluidly connected to said recirculating liquid in an essentially liquid filled container vessel, said surge vessel having therein said gas liquid interface with an overhead gas phase.

13. The process of claim 12 and including passing an inert gas through said overhead gas phase to purge said feed gas, or any component thereof, from said overhead gas phase.

14. The process of claim 12 in which said feed gas comprises an oxygen containing gas.

15. The process of claim 12 in which the recirculating portion of liquid is caused to fill said container vessel, said liquid being maintained in a recirculating flow condition by an axial flow impeller positioned therein, any gas escaping through the annulus between the container vessel and the shaft of said impeller being passed through a flame arrestor zone having a free surface of liquid therein, said gas being released through the discharge end of said flame arrestor zone.

16. The process of claim 12 in which fluid connection between said container vessel and said surge vessel is maintained through an external recirculation circuit, liquid flowing initially in a generally downward direction from said container vessel in said recirculation circuit for passage to said surge vessel, and liquid passing from said surge vessel in said recirculation circuit to said container vessel, with the flow of liquid from said recirculation circuit into said container vessel being in a generally upward direction.

17. The process of claim 16 in which the flow of said liquid in said recirculation circuit is facilitated by recirculation pump means positioned in said recirculation circuit.

18. The process of claim 1 in which the recirculating or portion of liquid is caused to essentially fill said container vessel, comprising a tube and shell reactor vessel, said gas bubble liquid mixture being maintained in a recirculating flow condition by the pumping of said mixture to and from said reactor vessel in a recirculation circuit external to said reactor vessel by recirculation pump means, the recirculating portion of said liquid being separated from the quiescent portion thereof by the retention of said quiescent portion in a separate surge vessel in fluid communication with said reactor vessel, said surge vessel having therein said gas-liquid interface with an overhead gas phase.

19. The process of claim 18 in which said fluid communication of the surge vessel with said reactor vessel is maintained through fluid communication of said surge vessel with the external recirculation circuit of said reactor vessel.

20. The process of claim 18 in which said feed gas comprises an oxygen containing gas 21. The process of claim 18 in which the gas bubble-liquid mixture is caused to flow from said reactor vessel in said recirculation circuit that is in fluid communication with an overhead flame arrestor zone having a free surface of liquid therein, with fluid communication between said recirculation circuit and said surge vessel being maintained by separate conduit means for passing a portion of said liquid from the recirculation circuit upstream of said recirculation pump means to said surge vessel and for passing said liquid from said surge vessel to said recirculation circuit downstream of said recirculation pump means.

22. The process of claim 21 in which the flow of said liquid from the recirculation circuit into said conduit means communicating with the surge vessel is initially in a generally downward direction, and the flow of said liquid from the conduit means into said regeneration circuit is in a generally upward direction.

23. The process of claim 22 and including venting gas from said flame arrestor zone when the circulation of said gas bubble-liquid mixture is interrupted.

24. An improved apparatus for the introduction of a gas into a body of liquid without appreciable loss of gas into an overhead gas phase comprising:

(a) a container vessel for at least a portion of said body of liquid, said portion to be maintained in a recirculating flow condition for the introduction of a feed gas stream thereto, said recirculation portion of the body of liquid having no gas-liquid interface with an overhead gas phase;

(b) mechanical means for separating said recirculating portion of the body of liquid from a relatively quiescent portion of said body of liquid, while maintaining fluid communication therebetween, said quiescent portion of the body of liquid having a gas-liquid interface and an overhead gas phase space and being adapted to accommodate a change in liquid level in response to a change in the volume of said body of liquid between the condition in which no gas bubbles are in said body of liquid and the condition that exists when a desired gas bubble concentration is developed within said body of liquid;

(c) mechanical means for establishing a recirculating flow condition within said recirculating portion of the body of liquid, the recirculation flow path and flow velocity of said recirculating portion of the body of liquid being such, relative to the fluid communication between said recirculating and quiescent portions of the body of liquid, that the bubbles of gas formed upon the introduction of feed gas into said recirculating portion of the body of liquid are maintained in dispersed form in the recirculating liquid, for gas dissolution in, or reaction with, said recirculating portion of the body of liquid, without any appreciable passage of said gas bubbles through the fluid communication between the recirculating portion of the body of liquid and the quiescent portion thereof and through the quiescent portion itself to the gas-liquid interface and thus without loss of gas to the overhead gas phase; and (d) conduit means for introducing a feed gas stream directly into said recirculating portion of said body of liquid, and not into the quiescent portion of said body of liquid so that the bubbles of gas are formed in said recirculating portion of the body of liquid and not in said quiescent portion thereof; whereby desired gas and liquid mixing and recirculating is advantageously achieved in the recirculating portion of the body of liquid without appreciable loss of gas to the overhead gas phase.

25. The apparatus of claim 24 in which said mechanical means for separating said portions of the body of liquid comprises baffle means positioned within said container vessel.

26. The apparatus of claim 24 in which said mechanical means for establishing a recirculating flow condition are such as to preclude the existence of any significant passive regions of said recirculating portion of liquid in which essentially no gas bubbles are dispersed in said liquid.

27. The apparatus of claim 24 and including means for passing an inert purge gas through said overhead gas phase.

28. The apparatus of claim 24 in which said mechanical means for establishing a recirculating flow condition comprises axial flow impeller means positioned within said container vessel.

29. The apparatus of claim 24 in which said mechanical means for establishing a recirculating flow condition comprises a hollow draft chamber positioned essentially centrally within said container vessel, said chamber having open ends at the top and bottom thereof as positioned with said container vessel, and impeller means positioned within said chamber and adapted to cause the passage of the gas bubble-liquid mixture in said recirculating portion of liquid to pass through said hollow draft chamber.

30. The apparatus of claim 29 in which said impeller means is adapted to facilitate the flow of said gas bubble-liquid mixture downward in said draft chamber and including guide baffle means for directing said mixture to the top inlet end of said draft chamber.

31. The apparatus of claim 30 in which the hollow draft chamber is conically flared at the upper end thereof.

32. The apparatus of claim 24 and including a separate surge vessel maintained in fluid communication with said container vessel by conduit means, said surge vessel adapted to contain a gas-liquid interface with an overhead gas space within said surge vessel.

33. The apparatus of claim 32 in which said means for establishing a recirculating flow condition comprises axial flow impeller means positioned within said container vessel, and including a packed flame arrestor zone adapted to receive liquid from said container vessel and to maintain a free surface of liquid therein, small amounts of gas passing through the annulus between the container vessel and the shaft of said impeller means passing into said liquid containing flame arrestor zone, and also including means to vent gas above said free surface from said flame arrestor zone.

34. The apparatus of claim 32 in which the conduit means for maintaining fluid communication between said container vessel and said surge vessel comprises separate conduit means for the passage of the liquid from the container vessel to said surge vessel, and for the passage of said liquid back from the surge vessel to said container vessel.

35. The apparatus of claim 34 in which said conduit means from said container vessel to said surge vessel extends initially in a generally downward direction, and said conduit means back to said container vessel extends in a generally upward direction into said container vessel, thereby minimizing the passage of gas bubbles to said surge vessel.

36. The apparatus of claim 24 in which said container vessel comprises a tube and shell reactor vessel, and including an external recirculation circuit for passing the gas bubble-liquid mixture to and from the reactor vessel, the quiescent portion of liquid being retained in a separate surge vessel in fluid communication with said reactor vessel, said surge vessel having therein said gas-liquid interface with an overhead gas phase.

37. The apparatus of claim 36 and including recirculation pump means to pump said mixture through said recirculation circuit.

38. The apparatus of claim 36 in which said recirculation circuit is in fluid communication with a flame arrestor zone, said zone including means for venting gas therefrom.

39. The apparatus of claim 36 and including conduit means to maintain fluid communication between said recirculation circuit and said separate surge vessel.

40. The apparatus of claim 39 which said conduit means comprises separate conduit means for the passage of the liquid from said recirculation circuit to said surge vessel, and for the passage of said liquid back from the surge vessel to said recirculation circuit.

41. The apparatus of claim 40 in which the conduit means from said recirculation circuit to said surge vessel extends initially in a generally downward direction, and said conduit means back to said recirculation circuit from said surge vessel extends in a generally upward direction into said recirculation circuit, thereby minimizing the passage of gas bubbles to said surge vessel.

* * * * *